3 Sheets—Sheet 1.

W. STEPHENS.
Knot-Tyer for Self Binders.

No. 228,228.        Patented June 1, 1880.

Witnesses:
Daniel R. Turner
John Jones

Inventor
William Stephens
By R.S. & A.P. Lacey Att'ys

3 Sheets—Sheet 2.

W. STEPHENS.
Knot-Tyer for Self Binders.

No. 228,228.  Patented June 1, 1880.

Witnesses:
Sam R. Turner
John Jones

Inventor:
William Stephens
by R.S. & A. Lacey
Att'ys.

3 Sheets—Sheet 3.

W. STEPHENS.
Knot-Tyer for Self Binders.

No. 228,228. Patented June 1, 1880.

Witnesses:
Saml R. Turner
John Jones

Inventor:
William Stephens
By R. S. & A. P. Lacey Attys.

UNITED STATES PATENT OFFICE.

WILLIAM STEPHENS, OF NEW RICHMOND, WISCONSIN.

KNOT-TYER FOR SELF-BINDERS.

SPECIFICATION forming part of Letters Patent No. 228,228, dated June 1, 1880.

Application filed December 31, 1879.

*To all whom it may concern:*

Be it known that I, WILLIAM STEPHENS, of New Richmond, in the county of St. Croix and State of Wisconsin, have invented certain new and Useful Improvements in Knot-Tyers for Self-Binders; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

This invention has for its object to furnish simple and efficient knot-tyers for self-binding harvesting-machines.

I will first describe my invention, and then specifically point it out in the claims.

Figure 1:
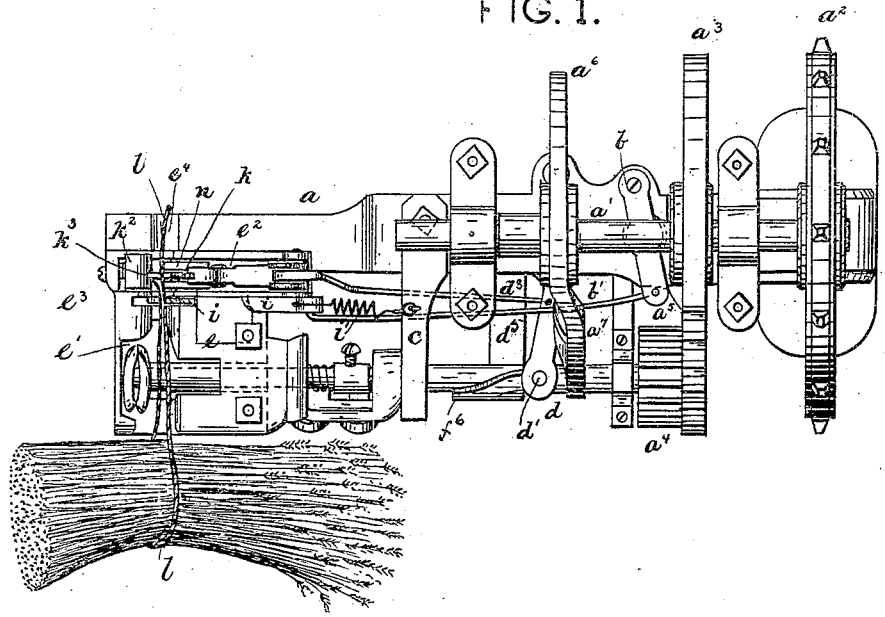
Figure 2:
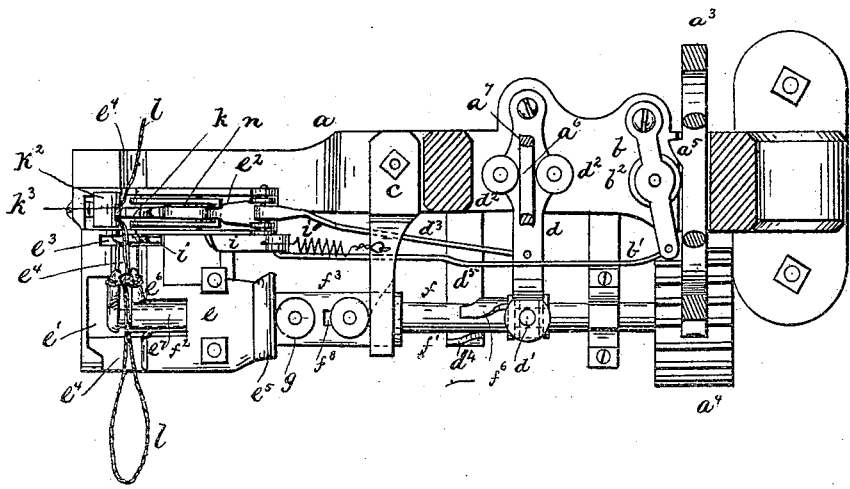
Figure 3:
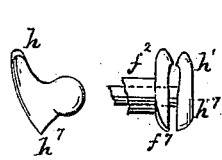
Figure 4:
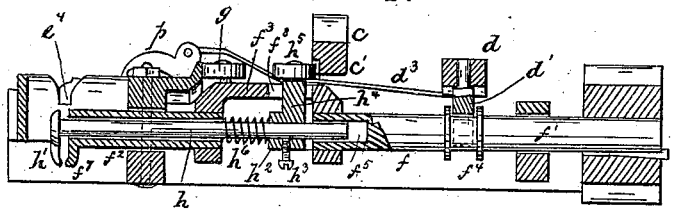
Figure 5:
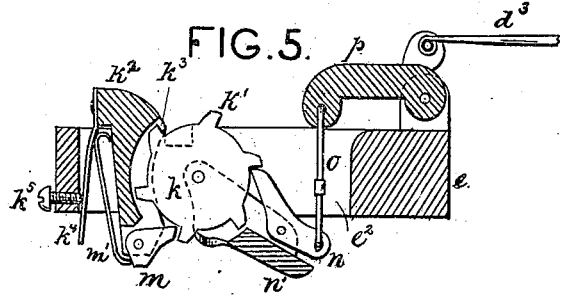
Figure 6:
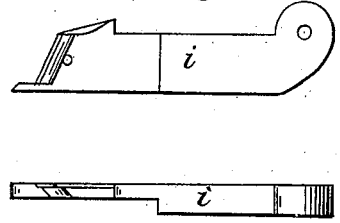
Figure 12:
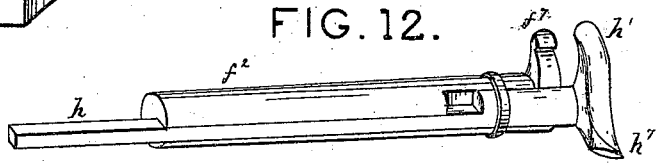
Figure 9:
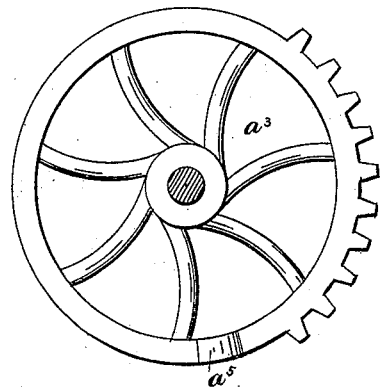
Figure 10:
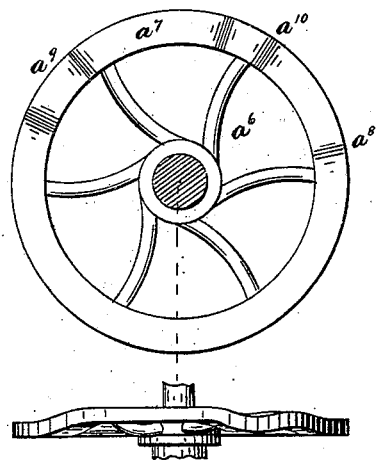
Figure 11:

In the drawings, Figure 1 is a plan view. Fig. 2 is a plan view with the actuating-wheels in section to uncover some of the mechanism lying below them. Fig. 4 is a vertical longitudinal section, the operating-wheels being removed. Fig. 5 shows the spur-wheel for holding the ends of the binding-cord. Figs. 3, 6, 7, and 8 are detail views of parts of the machine. Fig. 9 is the mutilated gear for operating the knot-tying shaft and jaws. Fig. 10 is the cam-wheel which gives a horizontal or lateral motion to the knot-tying shaft and jaws. Fig. 11 is the knot tied by my device, and Fig. 12 shows a modified form of the knot-tying shaft and jaws.

$a$ is a frame suitably formed and adapted to hold the several parts of my invention, and it is provided with means whereby it may be securely bolted to the frame of the harvester in proper relative position to the binding-arm and other operating mechanism.

Mounted on the frame $a$ is a shaft, $a'$, on the outer end of which is fixed the sprocket-wheel or pulley $a^2$, over which is put the chain or belt, which connects with the operating machinery of the harvester and imparts motion to the several parts of my invention. $a^3$ is a mutilated or segment gear-wheel mounted on the shaft $a'$, and arranged to engage the pinion $a^4$ on the end of the knot-tying shaft, and it has fixed on the side of its rim a cam, $a^5$, for operating the knife which cuts the band, as will be hereinafter fully explained. $a^6$ is a wheel placed on the shaft $a'$, and has its rim bent laterally in order to provide cams $a^7$ and $a^8$, arranged and adapted to give a lateral movement to the knot-tying shaft, for purposes hereinafter explained.

Figure 8:
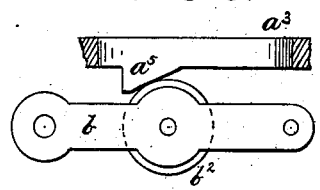
Figure 8:
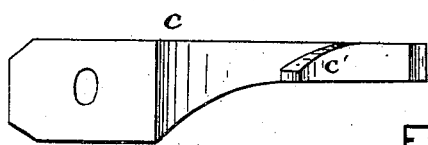
Figure 8:
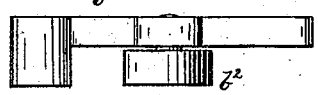

$b$, Figs. 1, 2, and 8, is a swinging lever, pivoted at one of its ends to the frame $a$, while to its opposite end is attached a rod, $b'$, which connects with and operates the knife which cuts the band. The lever $b$ has fixed to it a suitable friction-roller, $b^2$, which is engaged by the cam $a^5$ on the wheel $a^3$, which gives to it the necessary lateral movement for operating the knife.

Figure 7:
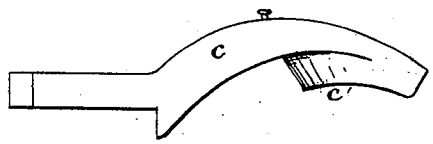

$c$, Figs. 1, 2, and 7, is a rigid arm having one end fixed to the frame $a$, while its opposite end projects over the knot-tying shaft. It has formed on its under side the inclined or cam projection $c'$, which engages with the knot-tying shaft and opens the jaws around which the cord is looped when being tied into the knot.

$d$ is a lever, pivoted at one end to the frame $a$, while its opposite end extends over the knot-tying shaft, to which it is connected by a forked swiveled bearing, $d'$. On the upper side of the lever $d$, I place two bearings, $d^2$, between which the rim of the wheel $a^6$ revolves. The bearings $d^2$ are so arranged that they will be engaged by the cams $a^7$ $a^8$, and the lever $d$ will be moved laterally, which movement imparts to the knot-tying shaft the requisite lateral movement for the purpose of looping and tying the knot in the cord, and also, by means of a connecting-rod, $d^3$, actuates the device which holds the end of the said cord.

$e$ is a head-piece, formed with the mortises $e'$ $e^2$, a bearing and guide-slot, $e^3$, and a cross-channel, $e^4$. It is also provided with a bearing in which is held the end of the knot-tying shaft, and it is held on the frame $a$ by suitable bolts.

$f$ is the knot-tying shaft, journaled in the frame $a$ and head $e$, and has fixed on one of its ends the pinion $a^4$, which is broad enough to permit a necessary lateral movement to adapt the said shaft to the different positions taken by the jaws in tying the knot. The shaft is made in two parts, $f'$ $f^2$, which are united by an arched coupling, $f^3$. The part $f'$ has fixed on it the collars $f^4$, between which forked bearing $d'$ is retained in position, and it has a socket, $f^5$, in its end next the coupling $f^3$, and has fixed on its outer side a shoulder or cam, $f^6$, which is engaged by the inclined end $d^4$ of the arm $d^5$, projecting from the under side of the frame $a$, as shown. The outer end or part, $f^2$, of the shaft $f$ is made hollow, as shown, and has formed on its outer end the hooked jaw $f^7$, arranged within the mortise $e'$ in the head-piece $e$. The coupling $f^3$ is made in the form shown as a matter of convenience. The shaft $f$ could be made in one entire piece, with the outer end made hollow, and having two slots arranged on opposite sides to give facilities for the adjustments hereinafter explained. The construction shown is much more convenient and gives better facilities for repairing in case of accident. The shaft $f$ slides laterally in its bearings in the operation of the device. On the top of the coupling $f^3$ is journaled a friction-wheel, $g$, which, in the revolution of the shaft, bears against the shoulder $e^5$ on the head-piece $e$. The coupling $f^3$ has formed through it a longitudinal slot, $f^8$, through which projects the shank of the adjustable collar, hereinafter described.

$h$ is a sliding bar placed in the hollow part $f^2$ of the shaft $f$, with its inner end extended through the coupling $f^3$ and into the socket $f^5$ in the part $f'$, as shown. On the outer end of bar $h$ is formed the jaw $h'$, which corresponds to and abuts against the jaw $f^7$ on the end of the shaft $f$. The bar $h$ slides laterally in the shaft $f$ and opens the jaws $f^7$ $h'$ to catch the binding-cord when the knot is being tied. On the bar $h$, near to the end of the part $f'$ of shaft $f$, I place a collar, $h^2$, which is held by a set-screw, $h^3$, so that it can be moved back and forth, as desired, along the said bar. The collar $h^2$ has a projection, $h^4$, which passes through the slot $f^8$, and has on its end the friction-roller $h^5$, which is engaged by the inclined projection $c'$ on the arm $c$, and is thereby moved laterally, carrying the bar $h$ with it, and thus opening the jaws $h'$ $f^7$ to grasp the binding-cord.

$h^6$ is a retracting-spring placed on the bar $h$. It bears against the collar $h^2$ and against the inner end of the part $f^2$ of hollow shaft $f$, and closes the jaws $h'$ $f^7$ after the latter have been opened and have received the cord between them.

$i$ is the knife, arranged to cut at right angles to and across the channel $e^4$. It slides in the bearing and guide-slot $e^3$, and is actuated by the rod or pitman $b'$, attached to the end of the swinging lever $b$, as shown. The knife, after cutting the cord, is thrown back by the spring $i'$.

$k$ is a catch-wheel provided with teeth $k'$, and journaled in the mortise $e^2$, so that its teeth turn across the channel $e^4$ and catch and fasten the ends of the cord $l$ between them and the shoulder $k^2$. The teeth $k'$ revolve through a slot, $k^3$, formed in the yielding shoulder $k^2$, fixed in the end of the mortise $e^2$. The gripe of the shoulder is regulated by a spring, $k^4$, and set-screw $k^5$.

The catch-wheel $k$ is prevented from turning backward by a small pawl, $m$, held by a spring, $m'$, as shown. It is made to revolve forward in the operation of the machine by a dog, $n$, pivoted on a swinging arm, $n'$, which is journaled on the axis of the catch-wheel $k$. The swinging arm $n'$ is, by preference, made double, or with two projections, which extend up on opposite sides of the wheel $k$, as shown in Figs. 1 and 2, and the dog $n$ is pivoted between the flanges on the outer or swinging end of said arm.

To the outer end of the dog $n$ is fixed one end of the link $o$, the opposite end of which is attached to the pivoted lever $p$, which is connected with and operated by the rod or pitman $d^3$ and lever $d$. When the dog $n$ is lifted by the rod $o$ and lever $p$ it engages with one of the teeth $k'$ and causes the wheel $k$ to revolve. The arm $n'$ is also swung upward on its axis, and keeps the dog in its proper place till the wheel $k$ is revolved far enough to catch the cord $l$ between one of its teeth and the shoulder $k^2$. The lever $p$ is pivoted to and between lugs formed on the upper side of the head-piece $e$.

This knot-tyer is intended to be used in connection with a binding-arm which carries the cord around the gavel by means of an eye or other suitable retaining device in its point or swinging end. The binding-arm swings so as to gather the grain and carry the cord under and over the gavel to the catch-wheel, as shown in Fig. 1. One end of the cord remains fixed in the tyer by the wheel $k$, while its other end passes through the eye in the end of the binding-arm and around the spool, from which it is unwound as the operation of binding progresses.

The cord is carried by the binding-arm back from the catch-wheel over the tyer, and is laid in the cross-channel $e^4$. It is, after the grain is gathered, further carried around the gavel and over the tyer and brought down into the channel $e^4$ and across the catch-wheel $k$, as shown in Figs. 1 and 2. In this position the two ends of the band lie close together in the channel $e^4$. The band by this movement has been drawn tightly around the gavel. As the cord is being passed around the gavel, as described, the several parts of the device will be in the position shown in Fig. 1. A further movement of the operating mechanism will cause the catch-wheel to revolve and grasp the end of the cord next the binding-arm, thus firmly securing both ends of the band. At the same time the shaft $f$ and bar $h$, with their jaws $f^7$ $h'$, are moved to the right (see Fig. 1) by the cam-wheel $a^6$ and lever $d$, and the shaft is further given a slight backward rotation by the arm $d^5$ and inclined shoulder $f^6$, which raises the jaws $f^7$ $h'$ to a vertical position, so that they catch both ends of the cord against the outer side of the said jaw $f^7$. Both cords or ends are drawn by the jaws along the mortise $e'$ and right against the angles or shoulders $e^6$ $e^7$. In this position the ends are held while a continued revolution of the shaft wraps the ends around both jaws, as shown in Fig. 2. This being done, the shaft is thrown to the left till the jaws are opposite and in line with the cross-channel $e^4$. The friction-wheel $h^5$ is engaged by the inclined projection $c'$ on arm $c$, and the jaw $h^7$ is pushed out and both ends of the band are caught between jaws $h'$ $f^7$. At this instant the knife cuts the band and the sheaf is discharged, and as it is discharged it draws the loop off the jaws and forms the knot shown in Fig. 11.

In the revolution of the wheel $a^6$, Fig. 10, the abrupt incline or shoulder $a^9$ strikes the wheels $d^2$ and causes an instantaneous lateral movement of the shaft $f$ to the right. The face $a^7$ holds the shaft steadily while it is further revolved and while the cord is being looped around the jaws. The cam or face $a^7$ having turned past the wheels $d^2$, the latter are released and the shoulder $a^{10}$ throws the shaft to the left till the jaws are in line with the channel $e^4$. A slight depression in the side of the wheel permits it to revolve farther without moving the shaft laterally, and while thus revolving the jaws are opened and grasp the cord, as hereinbefore explained. As soon as the cord is cut the shoulder $a^8$ engages the lever $d$ and pushes the shaft and jaws to the left into the position shown in Fig. 1. The movement of the lever $d$ by the shoulder $a^9$ operates the dog $n$ and throws one of the teeth $k'$ forward to grasp the cord.

The segment-gear $a^3$ is provided with the necessary number of cogs to give the required revolutions to the shaft $f$, and the several wheels are arranged relatively to each other and to the various parts of the mechanism, so that all the parts act at the proper time and with perfect precision.

In Fig. 12 is shown a modification in the arrangement and manner of constructing the part $f^2$ of the shaft $f$, the bar $h$, and the jaws $f^7$ $h'$. In this case the bar $h$ slides in a channel formed in the side of the shaft $f^2$, and the jaws are constructed so that the jaw $h'$ slides over and not against the side of the jaw $f^7$, as hereinbefore explained.

The jaw $h'$ is formed with a heel, $h^7$, which facilitates the movement of the cord $l$ when it is being looped around the jaws.

The band, when it is looped around the jaws, has the end which passes between the said jaws wrapped outside of the end or portion which extends to and around the gavel, and the end which extends to the catch-wheel passes over the part of the loop on the rear side of the jaw, as shown in Fig. 2.

It will be seen that when the band is cut and is drawn away from the device the cut ends will be held by the jaws while the loop is drawn over said ends and off of the jaws, so as to form the knot, as shown. As soon as the knot is tied the further movement of the bundle detaches the ends of the band from the jaws.

Having thus described my invention, what I claim, and desire to secure by Letters Patent, is—

1. The combination, with the shaft $f$, supporting and carrying the jaws $h'$ $f^7$, and having the collars $f^4$, the inclined shoulder $f^6$, and pinion $a^4$, of the frame $a$, the lever $d$, having shoulders $d^2$, the swiveled bearing $d'$, the wheel $a^6$, having cam-shoulders $a^8$ $a^9$ $a^{10}$, and the operating mechanism, substantially as and for the purpose set forth.

2. In a knot-tyer, the combination of the jaw $h'$, formed on the shaft $h$, the collar $h^2$, having stem $h^4$ and set-screw $h^3$, the shaft $f$, formed in the two parts $f'$ $f^2$, united by the arched coupling $f^3$, having slot $f^8$, the spring $h^6$, and the operating mechanism, substantially as and for the purpose set forth.

3. The combination, with shaft $h$, having the jaw $h'$, and the collar $h^2$, having projection $h^4$ and set-screw $h^3$, of the hollow shaft $f'$, having slot $f^8$, the arm $c$, having the cam-projection $c'$, the frame, and operating mechanism, substantially as and for the purpose set forth.

In testimony that I claim the foregoing as my own I affix my signature in presence of two witnesses.

WILLIAM STEPHENS.

Witnesses:
 S. N. HAWKINS,
 RICHARD J. COSGROVE.